(12) United States Patent
Neuenschwander (10) Patent No.: US 8,269,813 B2
(45) Date of Patent: Sep. 18, 2012

(54) ENTERPRISE SYSTEM AND COMPUTER PROGRAM PRODUCT FOR INTER-CONNECTING MULTIPLE PARTIES IN AN INTERACTIVE ENVIRONMENT EXHIBITING VIRTUAL PICTURE BOOKS (76) Inventor: Coby Neuenschwander, Chicago, IL (US)

( * ) Notice: Subject to any disclaimer, the term of this patent is extended or adjusted under 35 U.S.C. 154(b) by 24 days.

(21) Appl. No.: 12/712,381

(22) Filed: Feb. 25, 2010

(65) Prior Publication Data
US 2011/0254911 A1    Oct. 20, 2011

(51) Int. Cl.
H04M 11/00    (2006.01)

(52) U.S. Cl. .................... 348/14.01; 709/204

(58) Field of Classification Search .... 348/14.01–14.09, 348/14.11; 709/204; 725/106, 62, 133, 141, 725/153
See application file for complete search history.

(56) References Cited

U.S. PATENT DOCUMENTS

| | | | | |
|---|---|---|---|---|
| 7,080,042 | B2* | 7/2006 | Koike et al. | 705/52 |
| 7,262,788 | B2* | 8/2007 | Ono et al. | 348/14.09 |
| 7,546,334 | B2* | 6/2009 | Redlich et al. | 709/201 |
| 2002/0161839 | A1* | 10/2002 | Colasurdo et al. | 709/204 |
| 2005/0289590 | A1* | 12/2005 | Cheok et al. | 725/37 |
| 2006/0271627 | A1* | 11/2006 | Szczepanek | 709/204 |
| 2008/0098442 | A1* | 4/2008 | Greenbaum | 725/86 |
| 2009/0254802 | A1* | 10/2009 | Campagna et al. | 715/209 |
| 2010/0070899 | A1* | 3/2010 | Hunt et al. | 715/769 |
| 2010/0071003 | A1* | 3/2010 | Bychkov et al. | 725/46 |
| 2010/0223161 | A1* | 9/2010 | Hayashi et al. | 705/27 |
| 2011/0063404 | A1* | 3/2011 | Raffle et al. | 348/14.08 |
| 2011/0271192 | A1* | 11/2011 | Jones et al. | 715/727 |

* cited by examiner

Primary Examiner — Curtis Kuntz
Assistant Examiner — Maria El-Zoobi
(74) Attorney, Agent, or Firm — Steven Rinehart (57) ABSTRACT A method, computer program product and system are disclosed for facilitating the recreational review of printed picture books by two distantly separated parties video conferencing via the Internet, LAN, WAN or the like. A central managing forum uses uniquely configured data processing device(s) to electronically bring two or more related parties into audio, video and autographic contact in a manner which simulates the bedside reading of picture book and prompts the interconnected parties to interactively navigate virtual copies of popular printed media uniquely stored and made digitally available by the central managing forum.

23 Claims, 7 Drawing Sheets

ENTERPRISE SYSTEM AND COMPUTER PROGRAM PRODUCT FOR INTER-CONNECTING MULTIPLE PARTIES IN AN INTERACTIVE ENVIRONMENT EXHIBITING VIRTUAL PICTURE BOOKS

BACKGROUND OF THE INVENTION

1. Field of the Invention

This invention relates to online video conferencing software that simulates the bedside reading of a digital picture book to a child by a parent or relative.

2. Description of the Related Art

Parents who are compelled by professional and business obligations to travel frequently often find themselves unable to interact meaningfully with their children while separated from them. This separation can be a source of anxiety, distress, and depression for both parents and children alike.

While parents often attempt to mitigate the effects of this parental separation with phone calls and/or written correspondence with their children, parents find that their younger children lack the communicative abilities to carry on consequential, memorable or emotive exchanges through the strictly written and oral mediums currently available to them.

Parents separated by great distances from their children wish to have the same ability while separated that they have with their children when present: the ability make use of picture books and visual props to interact interpersonally with their children in a relaxed environment, as many parents enjoy before bedtime.

SUMMARY OF THE INVENTION

From the foregoing discussion, it should be apparent that a need exists for an enterprise system and computer program product for inter-connecting multiple parties in an interactive environment exhibiting virtual picture books. The present invention has been developed in response to the present state of the art; and, in particular, in response to the problems and needs in the art that have not yet been fully solved by currently available methods, systems and apparatus, and that overcome many or all of the above-discussed shortcomings in the art. Accordingly, the present invention has been developed to provide an enterprise system and computer program product for inter-connecting multiple parties in an interactive environment exhibiting virtual picture books Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention discloses a computer program product comprising a computer readable medium having computer usable program code executable to perform operations for displaying digitized graphic media to multiple interconnected parties. The operations of the computer program product comprise incorporating identifying personal information of one or more users into a database under the exclusive control of a central managing forum, wherein said identifying personal information is voluntarily provided by the one or more users to the central managing forum via a computer network for a purpose of creating exclusive user accounts.

The operations of the computer program product further comprise storing reading preferences of the one or more users in the database; prompting a user to create a reading session; prompting the user to choose a digitized picture book from a pool of digitized picture books stored in a computer readable medium; and prompting via a computer network one or more users to join the reading session who have been selected by the user creating the session;

The operations of the computer program product further comprise interconnecting one more users prompted to join the reading with the user creating the reading session, such that each of the users in the reading session are in video, audio and autographic contact with each of the other users in the reading session; simultaneously displaying the digitized picture book to each of the one or more users in the reading session; prompting the one or more users in the reading session to interactively navigate the digitized picture book; and tallying the number of times the digitized picture book is displayed in reading sessions created by users.

The computer program product may further comprise, in some embodiments, offering the functional ability to create a membership network accessible only to users who have opted in to the membership network and been approved by one or more network administrators.

The central managing forum may store and display a plurality of icons hyperlinked to digitized picture books preselected by a user to appear in a virtual bookshelf, wherein the virtual bookshelf is designed to visually resemble an actual bookshelf and exclusively accessible to a single user and the central managing forum. In some embodiments, the user preselecting one or more digitized picture books to appear in the virtual bookshelf may be a user other than the user with exclusive access to the virtual bookshelf.

The central managing forum may analyze similarities and differences between the digitized picture books appearing in a plurality of virtual bookshelves and make recommendations that one or more users add specific digitized picture books to one or more virtual bookshelves which specific digitized picture books are identified from the analysis of similarities and differences.

The first user may make a recommendation that one or more second users add a specific digitized picture book to a virtual bookshelf. The computer program product may further comprise previewing a digitized picture book to a user in a pop-up window on a computer display. The computer program product may further comprise displaying statistics representative of a plurality of users' reading habits to a user.

The pool of digitized picture books may be updated by a plurality of third-parties in logical connection with the central managing forum, wherein the central managing forum awaits the active update of the pool of digitized picture books by the third-parties.

The simultaneously displayed digitized picture book may be overlaid with virtual buttons activated by the interconnected users to navigate pages of the displayed digitized picture book. The pictures in the simultaneously displayed digitized picture book may be automatically altered by the central managing forum to create the perception of animation using one effect from the group consisting of: a zooming effect, a fading out effect, a morphing to another image effect, a spiraling effect, and an exploding effect. The computer program product may further comprise inviting a plurality of users to join a reading session created by an author who has written the digitized picture.

It is another feature of the present invention to provide a system to display digitized graphic media to multiple interconnected parties, the system comprising a processor; a data storage means for storing data; and a central managing forum to store, transfer and deliver data over an Internet to a plurality of users.

The central managing forum recited by the system substantially incorporates all of the operations of the above disclosed computer program product, including an incorporation module configured to incorporate identifying personal information of one or more users into a database under the exclusive control of a central managing forum, wherein said identifying personal information is voluntarily provided by the one or more users to the central managing forum via a computer network for a purpose of creating exclusive user accounts; a storage module configured to store reading preferences of the one or more users in the database; and other modules substantially incorporating the operations of the computer program product.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are provided. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention. The apparatus modules recited in the claims may be configured to impart the recited functionality to the apparatus.

Figure 1:
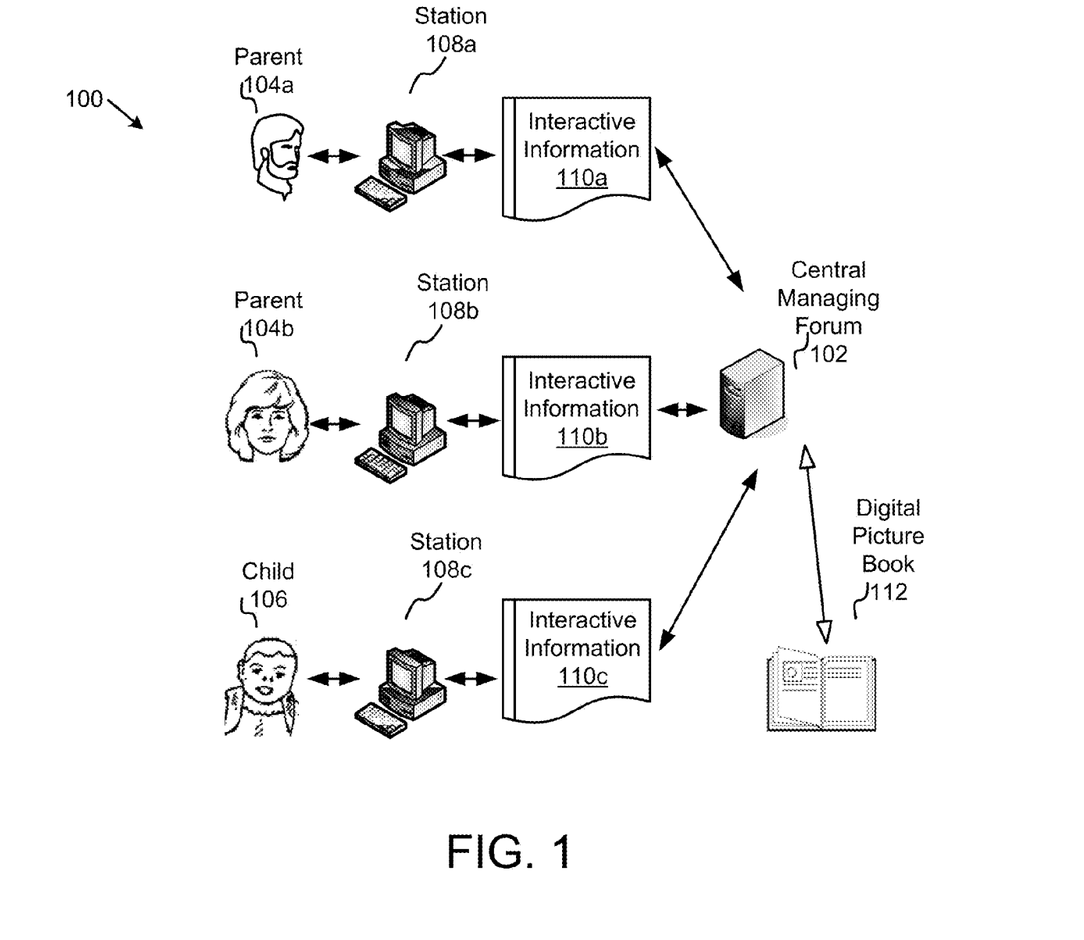
FIG. 1 is a block diagram illustrating one embodiment of a computer system that inter-connects multiple parties in an interactive environment exhibiting virtual picture books in accordance with the present invention.

FIG. 1 is a block diagram illustrating one embodiment of a computer system 100 that inter-connects multiple parties in an interactive environment exhibiting virtual picture books in accordance with the present invention. The system 100 includes a central managing forum 102, parents 104a-b, a child 106, stations 108a-c, interactive information 110a-c, and a digital picture book 112.

The central managing forum 102 comprises a system or computer program running on one or more data processing devices (DPDs), such as a server, computer workstation, router, mainframe computer, or the like. In various embodiments, the DPD comprises one or more processors. The processor is a computing device well-known to those in the art and may include an application-specific integrated circuit ("ASIC").

In the present invention, the central managing forum 102 interconnects one or more stations 108 by routing video, graphic and audio data captured by cameras and microphones at each station 108a-c and retransmitting that data, along with digital images of the pages of picture book preselected by one more station users, to other stations 108 in logical connection with the central managing forum 102, which stations 108a-c are in the same reading session with one another.

The central managing forum 102 stores digital copies of picture books in computer readable memory, which digital picture books have been downloaded, received, and/or gathered from one or more book publishers electronically via the Internet. Parents 104a-b or the child 106 browse the pool of digital picture books stored and made available by the central managing forum 102 and choose a digital picture book 112 to be made navigable during virtual read sessions established by one of the parents 104a-b or child 106.

The central managing forum 102 may, in typical embodiments, be in logical communication with publishers and/or stations 108 through a networked environment, such as local area network (LAN) or wide area network (WAN). Publishers, in some embodiments, upload, or transfer, digital picture books 112 to the central managing forum 102 using variations of the Simple Mail Transfer Protocol (SMTP), Internet Message Access Protocol (IMAP), Post Office Protocol (POP), File Transfer Protocol (FTP), or other protocols well-known to those of skill in the art.

The parents 104a-b and/or child 106 interface with the central managing forum 102 through the stations 108a-c. The stations 108a-c may comprise on one or more data processing devices (DPDs), such as a server, computer workstation, router, mainframe computer, or the like. The processor is a computing device well-known to those in the art and may include an application-specific integrated circuit ("ASIC").

The stations 108a-c may also comprise personal DPDs such as laptops, Palm Pilots®, digital cameras, and the like. The stations 108a-c comprise the software, systems and functionality necessary to facilitate video-conferencing and video playback.

The central managing forum 102, in the shown embodiment, comprises a database management system (DBMS) or relational database management system (RDBMS), such as Oracle, SQL, FireBird, IBM DB2®, or the like. In the shown embodiment, one or more parents 104 login to an account they have created with the central managing forum 102, which account membership information is stored in computer readable database memory accessible by the central managing forum 102.

The membership information, in the preferred embodiment, is stored in a database; and comprises not just personal identifying information, such as name, address, email, telephone, IP address information, age, address, gender, credit rating, email, telephone number, income, and education, but also reading preference information.

The reading preference information comprises titles of picture books which a parent 104 or a child 106 (interchangeably a "user") prefer over the other titles available and uploaded by publishers to the central managing forum 102. In some embodiments, the reading preferences are determined by the user associated with the account after reviewing available titles in reading sessions. In other embodiments, the reading preferences are determined by the central managing forum 102 after analyzing historical title selection preferences of other users with similar reading preferences. If, upon analysis, the central managing forum 102 concludes that a specific title in its pool of available titles is preferred by a statistically significant percentage of users who also share a preference for one or more other titles identified, the central managing forum 102 will automatically update the reading preferences of one or more of the parents 104a-b or children 106, or recommend that a parent 104 or child 106 do so.

In some embodiments of the present invention, functionality enabling a first user to make its reading preferences available to other users is presented, including other users not in the first user's friend network.

Titles included in a user's reading preferences are displayed, in typical embodiments, to that user in a virtual bookshelf while that user is logged into the central managing forum 102.

During the reading session, video, audio, textual and graphic information and data is transmitted back-and-forth across signal bearing mediums accompanied by digital pictures of the pages of a picture book 112, which digital picture book 112 is the focus of the reading session. The users to the virtual reading session are interconnected to each other through the central managing forum 102 and participate in a reading session created by one or more users.

In various embodiments of the present invention, the digitized picture book 112 may comprise digital copies of books published for adult target readership, or young adult readership, in which embodiments the digitized picture book 112 may consist of pictures of text rather than pictures of traditional graphic art, or may comprise textualized print in computer readable storage exclusive of traditional graphic art.

A large plurality of users may be interconnected during the reading session, or the reading session may interconnect only two. The central managing forum 102 prominently displays the digital picture book 112 to each of the users interconnected in the reading session such that the digital picture book 112 is the focus of the reading session. The teachings of the present invention thus allow a parent 104 to read a book to a child 106, even though separated from the child 106 by great distances.

The central managing forum 102 may handle data exchanges, at any given time, simultaneously for a plurality of reading sessions involving different users. For the purposes of the present invention, this information transmitted and shared among users in reading sessions is referred to as "interactive information." The interactive information 110 transmitted to each of the users in a reading session by the central managing forum 102 varies from one user to another in that the central managing forum 102 relays a unique version of the interactive information 110 to each user interconnected to the reading session such that each version of the interactive information 110 each user receives does not contain the same interactive information 110 being transmitted in real-time by that individual user to the central managing forum 102.

For example, in the shown embodiment, parent 104a receives the interactive information 110a, which comprises real-time video and audio feeds of parent 104b and child 106, but does not comprise parent 104a's own video and audio feed, which are transmitted through the central managing forum 102 in real-time to parent 104b and child 106.

In some embodiments of the present invention, users designated with special status by the central managing forum 102 may participate concurrently in a plurality of reading sessions. These users may include authors, publishers, politicians, or other users of renown reputation or stature.

Users of the present invention may also secretly browse the contents of their individualized virtual book shelves during reading sessions unbeknownst to other users participating in the reading session. These users, upon finding a digitized picture book 112 which they desire to review, may abandon the previously selected digitized picture book 112 and supplant it in the reading session with the newly found digitized picture book 112.

Parents 104 and children 106 may be prompted by the central managing forum 102 to review or evaluate titles in the pool of available titles which they have read. These reviews may be compulsory before further titles can be accessed within the central managing forum. Monetary payments may be required of one or more users by the central managing forum 102 before select titles in the pool of available titles are made accessible in a reading session. These monetary payments may be made via electronic means well-known to those of skill in the art, including PayPal®, credit-card credits, direct bank deposits, eCheck, and the like. The amount of the payment may be determined in accordance with a predetermined payment criteria established automatically by the central managing forum, publishers, or third-parties who control the central managing forum.

In some embodiments of the present invention, the central managing forum 102 may offer users the option of purchasing hard-copies of one or more of the digital picture books 112 available in the pool of digital picture books through a virtual shopping cart. In some embodiments, a user's account may be configured to automatically make a purchase of the hard-copy of one or more digital picture books 112 which exceed a predetermined threshold in one or more users' reading preferences.

In some embodiments, users pay a monthly, weekly, annual, or bi-annual subscription for full, or partial, access to the pool of digitized picture books.

In the present invention, the central managing forum may also route interactive information to invisible third-parties who manage the central managing forum 102, whose presence in the reading session is not apparent to the other users participating in it.

Figure 2:
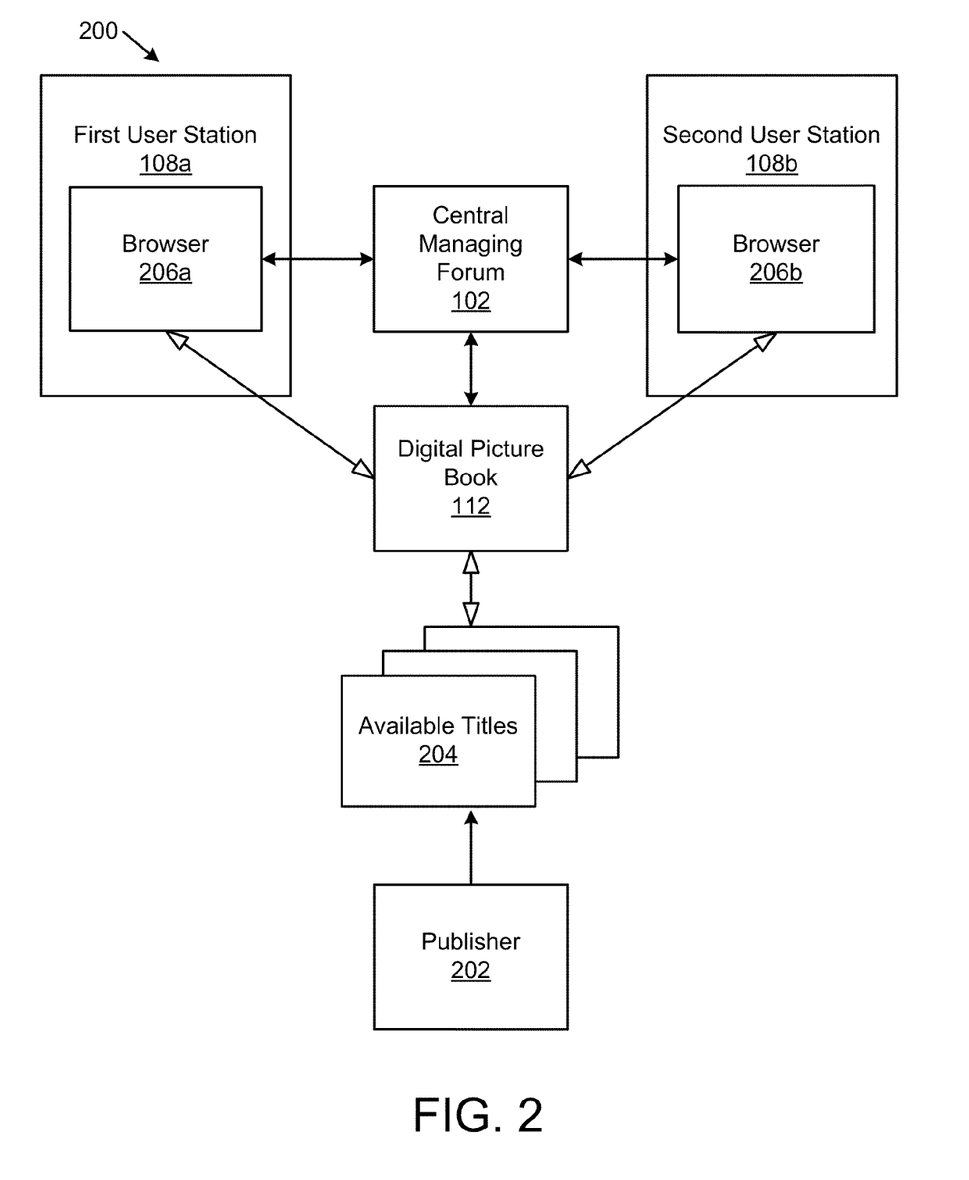
FIG. 2 is a system resources chart illustrating one embodiment of a system that inter-connects multiple parties in an interactive environment exhibiting virtual picture books in accordance with the present invention.

Referring now to FIG. 2, a system resources chart illustrating one embodiment of a system 200 that inter-connects multiple parties in an interactive environment exhibiting virtual picture books in accordance with the present invention. The system 200 comprises a central managing forum 102, a first user station 108a, a second user station 108b, a digital picture book 112, a publisher 202, a pool of available titles 204, and browsers 206a-b.

The central managing forum 102, user stations 108a-b, and digital picture book 112 are substantially described above in relation to FIG. 1.

The publisher 202 uploads digital picture books 112 to the central managing forum 102, which digital picture books are added to the central managing forum's pool of available titles 204. The pool of available titles 204 comprises all the digital picture books 112 available for review during a reading session by users. Users may select titles from this pool of available titles for inclusion in a user's virtual book shelf after logging into the central managing forum 102.

Figure 3:
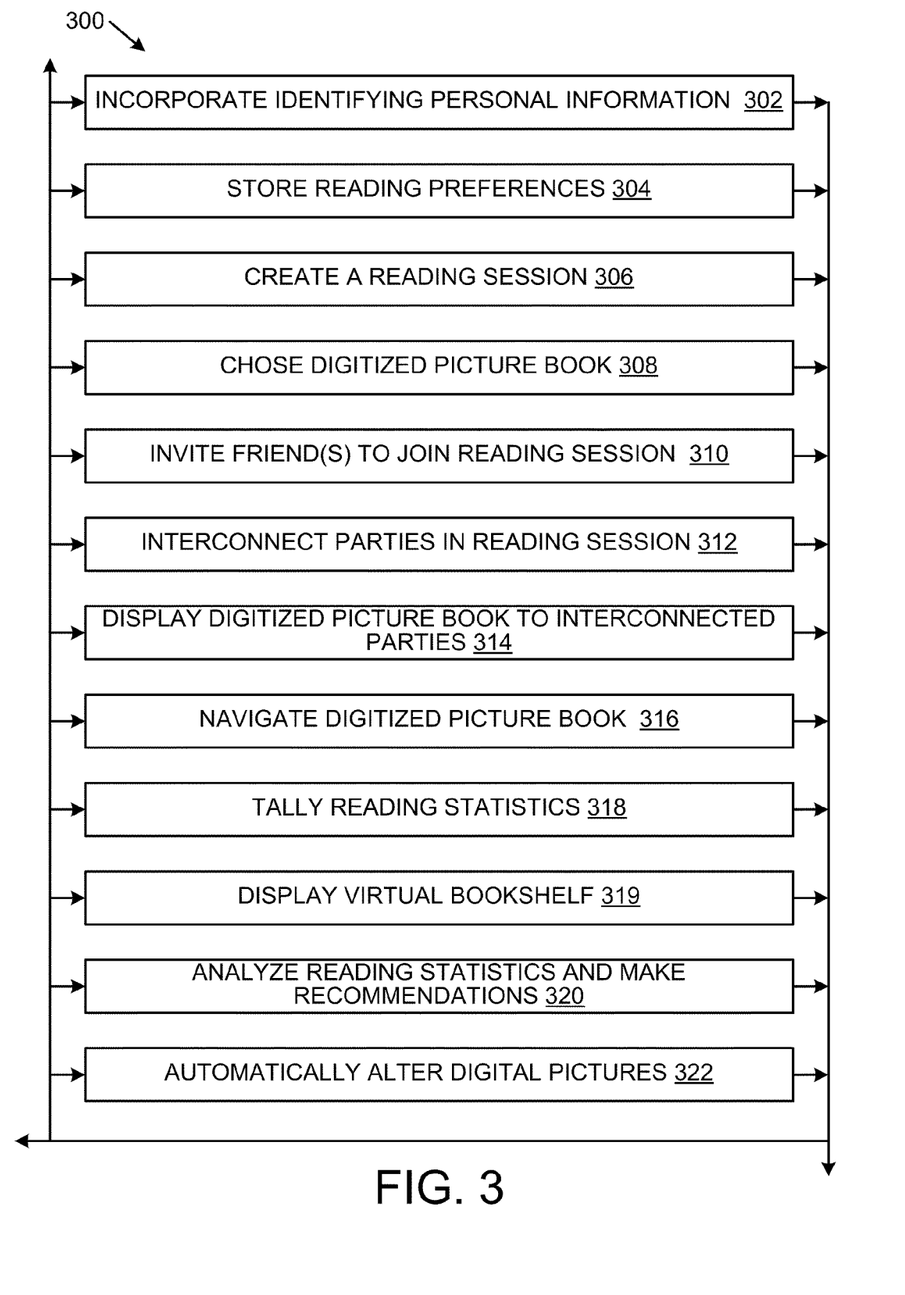
FIG. 3 is a flowchart illustrating methods of the present invention, including steps which may be performed for interconnecting multiple parties in an interactive environment exhibiting virtual picture books in accordance with the present invention.

FIG. 3 is a flowchart illustrating methods of the present invention, including steps which may be performed for interconnecting multiple parties in an interactive environment exhibiting virtual picture books in accordance with the present invention.

The method 300 begins with incorporating 302 identifying personal information from a parent 104, child 106, or other user into a database or relational database under the control of the central managing forum 102.

Next, the method 300 progresses by storing 304 the reading preferences of the user, which are displayable in a virtual bookshelf to the user after logging into an account exclusively associated with that user under the control of the central managing forum 102.

In various embodiments of the present invention, digital picture books 112 may be sorted and virtually displayed to users in a plurality of virtual bookshelves indicative of a class of books featured in that bookshelf. Some bookshelves may feature newly released titles, others may feature titles with discounted price points while still others may feature titles by genre or category, such as legal, fictional, historic, or non-fictional. Still other bookshelves may feature books by digital effects associated with them, including animation, flash presentations, or author commentaries.

In some embodiments of the present invention, users may upload customized icons or labels to identify bookshelves virtually displayed within their accounts. In some embodiments of the present invention, new users are given, or assigned, virtual bookshelves organized with titles preselected by the central managing forum 102 to maximize profitability to a third-party maintaining the central managing forum 102, and/or to maximize user interest in reading digital picture books 112, and/or to cater to the presumed preferences of the user based on age and/or demographic information, and/or titles picked by an editor, and/or titles specific to a season or holiday, and/or newly released titles by publishers doing business with the central managing forum 102, and/or titles within a preselected range of prices.

A user, or parent 104, logged into the central managing forum 102 creates 306 a reading session and chooses a digitized picture book 112 to read with one or more other users, such as a child 106, in the reading session.

In typical embodiments of the present invention, users may be invited by other family members to join a membership network, or friend network, which is stored and organized in computer readable memory by the central managing forum 102. The friend network comprises identifying information for a plurality of users who are associated familiarly, professionally, ethnically, religiously, geographically or the like.

Users within a friend network may be prompted, or invited 310, by other users within the same friend network to join the reading session. Once two or more users have joined the reading session, the users to the reading session are interconnected 312, and put into real-time, asynchronous audio, video and autographic contract with one another.

In typical embodiments of the present invention, each user will have one or more friend networks exclusively associated with him or her. Thus, friend networks may be an internal product of each user's account and existentially dependent on the existence of a one or more user accounts; or, additionally and/or alternatively, friend networks may be organized and stored within a database record storing information forming a single user and existing dependently on one or more user accounts.

In some embodiments, multiple users may login to the central managing forum 102 through the same user account, or may be logged into the central managing forum 102 simultaneously with another user vis-à-vis the same account. For example, children 106 who do not have separate user accounts may use a parent's 104 account to login and join a reading session with their parent 106 in a remote locale. For that reason, a user's friend network may comprise multiple versions of a single user's own account in the friend network.

Subsequently, the method 300 continues by displaying the digital picture book 112 that was selected prior to the creation of the reading session. Virtual buttons are overlaid across the digital picture book 112 such that each user participating in the reading session has the ability to navigate 316 through the pages of the digital picture book 112 for himself and the other users in the session.

Multiple virtual bookshelves may be browsed 319 by any of the users to a reading session during the reading session. This bookshelf browsing takes place unbeknownst to the other users in the session not participating in the browsing until a substitute digital picture book selection 112 is made by the user browsing the one or more virtual bookshelves.

Users have the discretion to terminate the reading session after, or during, the navigation of the digital picture book 112. The central managing forum 102 tallies 318 statistics gathered during the reading session, including the amount of time the users spent in the reading session, the amount of the book that the users finished navigating, and the bandwidth used by the users to the reading session, and stores these statistics in computer readable memory where they are made available to publishers 202 and used in later analysis 320 of users' reading preferences.

In certain embodiments of the present invention, the modules of the central managing forum 102 alter the data forming one or more digital picture books 112 such that images in the digital picture books 112 can be displayed in a non-static fashion. In some embodiments of the present invention, the central managing forum 102 automatically alters the digital picture books 112 to create the perception of animation of their images using one effect from the group consisting of: a zooming effect, a fading out effect, a morphing to another image effect, a spiraling effect, an exploding effect, or an effect which creates the perception of a page in the digital picture book 112 turning to a subsequent or previous page. In some embodiments, this alteration takes effect before the digital picture book 112 selected for use in a reading session is saved in memory. In other embodiments, the data forming the digital picture book 112 is manipulated in real-time as it is viewed in a reading session to create visual effects on the displays and/or stations 108 of the users participating in the reading session.

Figure 4:
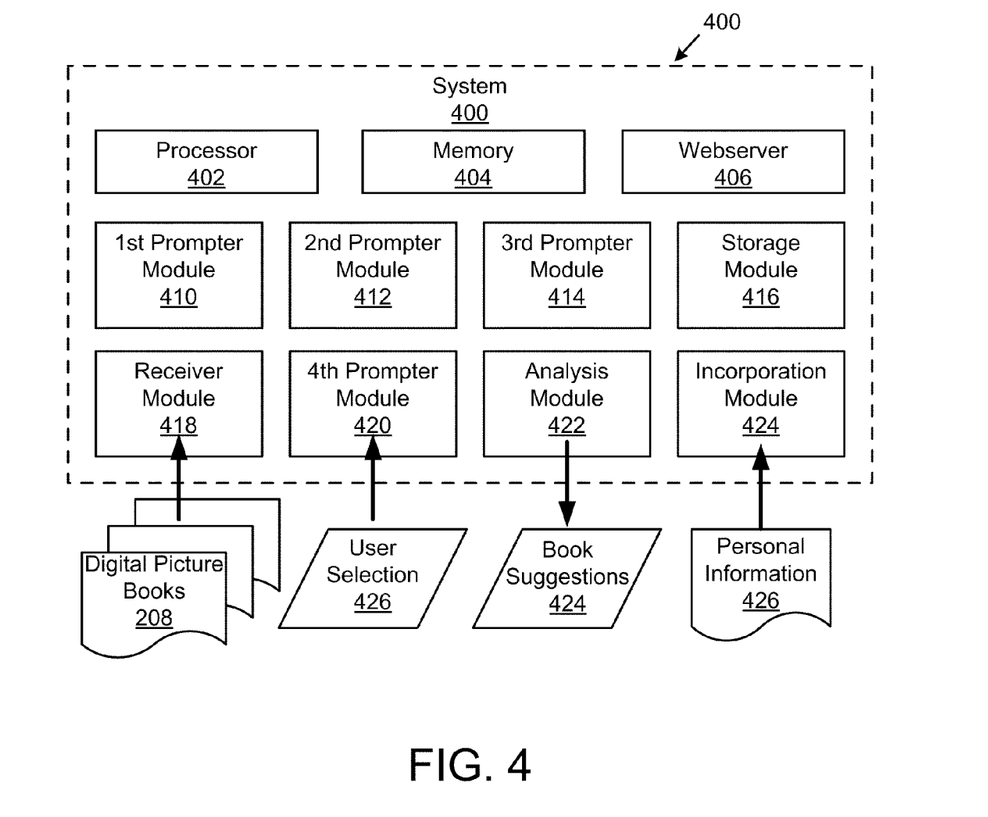
FIG. 4 is a block diagram illustrating components of one embodiment of an enterprise system for inter-connecting multiple parties in an interactive environment exhibiting virtual picture books in accordance with the present invention.

FIG. 4 is a block diagram illustrating components of one embodiment of an enterprise system 400 for inter-connecting multiple parties in an interactive environment exhibiting virtual picture books in accordance with the present invention. The system 400 includes a processor 402, a memory 404, a webserver 406, a first prompter module 410, a second prompter module 412, a third prompter module 414, a storage module 416, a receiver module 418, a fourth prompter module 420, an analysis module 422, and an incorporation module 424.

The processor 402 is well-known to those of skill in the art.

The memory 404 comprises any computer readable memory, volatile or non-volatile, internal or external, in logical communication with the processor 402. The membership records, available titles 204, reading preferences, and friend networks are all stores in the memory 404 and accessible there by the system 400 and central managing forum 102.

The webserver 406 is well-known to those of skill in the art.

The first prompter module 410 prompts a user interacting with the system 400 to create a reading session.

The second prompter module 412 prompts a user to pick a digital picture book 112 from a virtual library which displays the titles and covers of the books in the pool of available digital picture books 208. In some embodiments of the present invention, a user is prompted through the use of an heir-down virtual menu choose whether to preview a digital picture book 112, read the digital picture book 112 in a reading session, or recommend the digital picture book 112 to other user(s).

The third prompter module 414 prompts one or more users in a friend network to join a reading session with the user who chose a digital picture book 112 from the pool of available digital picture books 208.

The storage module 416 stores interactive information, reading statistics, membership records, digital pictures books 112, and the like in memory 404. The storage module 416 may comprise a peripheral device which is internal or external to the central managing forum 102, such as a disk-drive.

The receiver module 418 is configured to receive digital picture books electronically from publishers 202, which are made available to parents 104 and children 106.

The fourth prompter module 420 prompts users interconnected during a reading session to navigate a digital picture book 112 by placing visible and/or non-visible virtual button over, or near, selected portions of the digital picture book 112 as it is displayed on users' GUIs. In some embodiments, a user may navigate to subsequent pages in the digital picture book 112 by clicking virtual buttons overlaid on the page corners, or navigate to previous pages using the virtual buttons located elsewhere in the displayed digital picture book 112. The fourth prompter module 420 allows users to navigate digital picture books 112 using virtual buttons displayed via a graphical user interface (GUI) coupled to the stations 108a-b.

The analysis module 422 analyzes the reading habits of all users in the system using predetermined algorithms to predict the future reading preferences of newer users based on the identified and saved reading preferences of older users. The analysis module 422, in various embodiments, is configured to make recommendations that users add one or more digital picture books 112 to their reading preferences shown graphically in each users' virtual bookshelf.

In various embodiments, the analysis module 422 may additionally make available to the parents 104a-b information about a commercial offering, including pictures, video, written descriptions, hyperlinks, and contact information of third-parties who have subscribed to an advertising service made available to them by the central managing forum 102, which commercial offerings are made to targeting users during reading sessions.

The system 400 includes an incorporation module 424. Various embodiments of the incorporation module 424 may be configured to scan a parent's 104 email contacts using means well-known to those of skill in the art, including emails contacts stored in Microsoft Outlook, Thunderbird, Yahoo! Mail, and the like. The incorporation module 424 may search for contact information of parents 104, children 106, and other family members related to a specific user, then make recommendations that family members identified by that contract information registered with the central managing forum 102 through the incorporation module 424.

Figure 5:
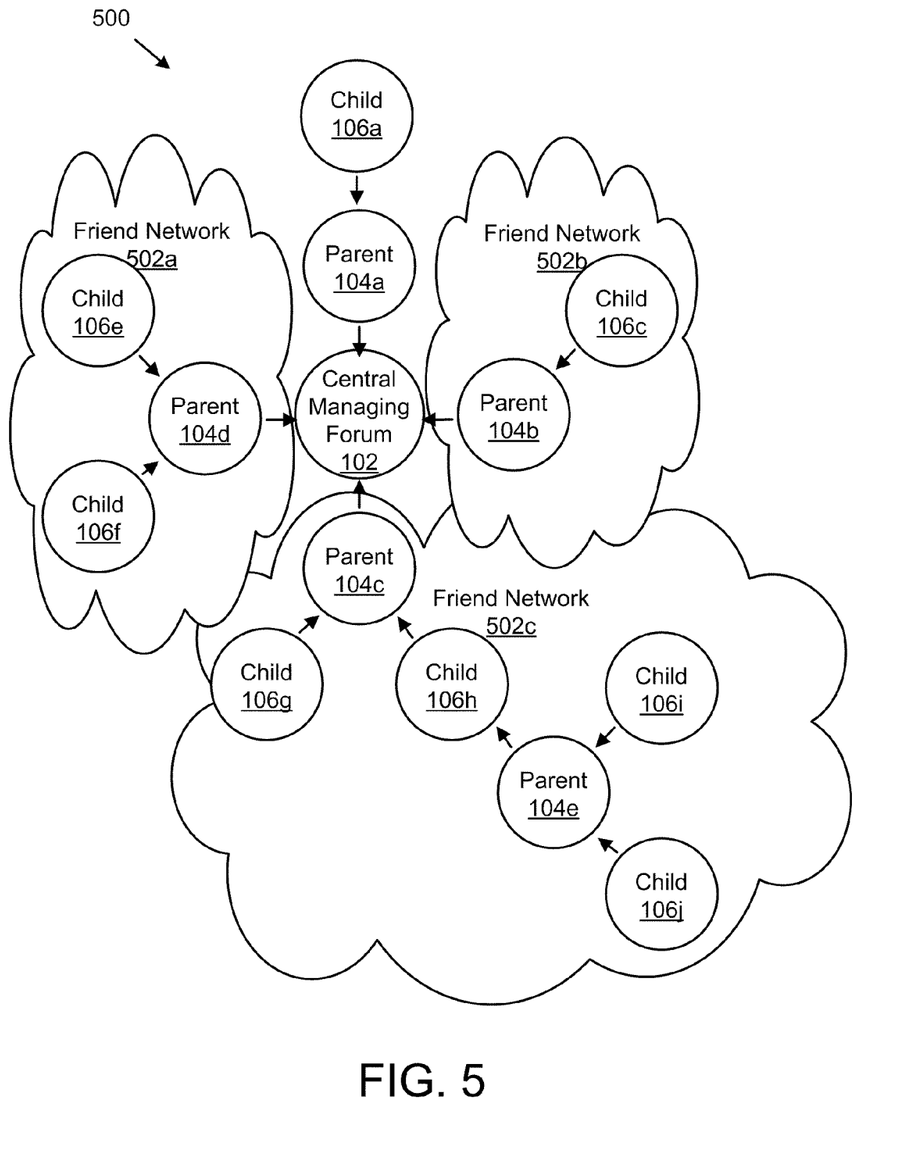
FIG. 5 is a Booch relationship diagram illustrating the interrelationships and organization of membership records created by the operations and modules of the present invention.

FIG. 5 is a Booch relationship diagram illustrating the interrelationships and organization of membership records created by the operations and modules of the present invention.

FIG. 5 illustrates the manner in which four families are incorporated in the central managing forum 102. Parents 104b-d have all formed friendship networks 502a-c, and invited their familial descendants to join each of these respective friend networks 502.

Parent 104d has prompted children 106e-f to join friend network 502a, and the children 106e-f have joined friend network 502a. Likewise parent 104c has prompted children 106g-h to join friend network 502c, and child 106h has invited a grandchild 104e to subsequently join, who has then invited other great grandchildren 106i-j to join friend network 502c. Friend networks 502 are stored in memory 404 using a modified B-tree graph data structure.

Figure 6:
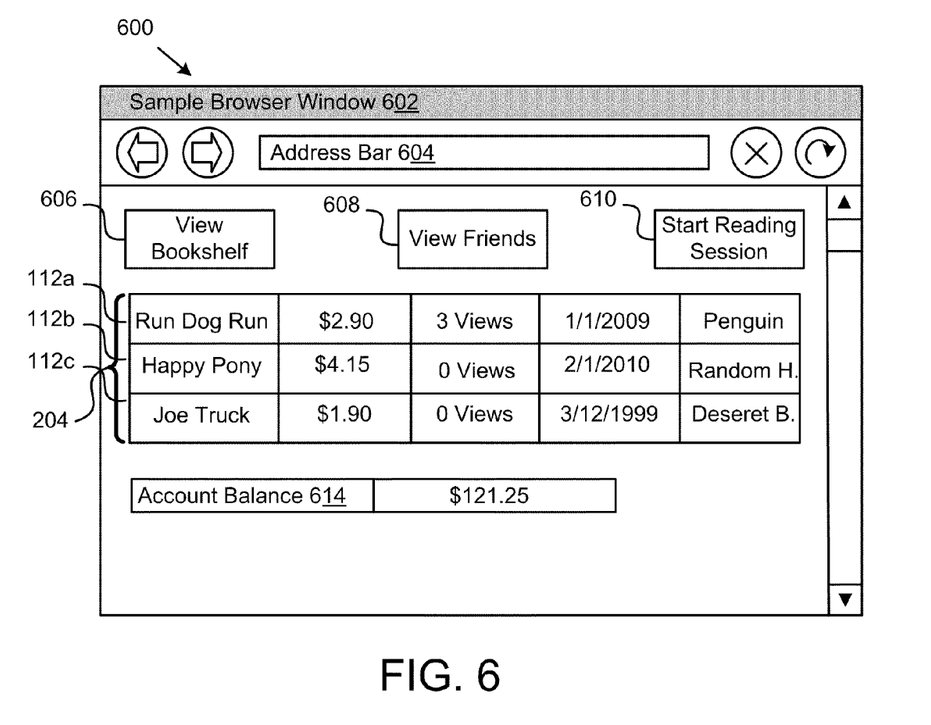
FIG. 6 is a layout of browser manipulated by one embodiment of the present invention to inter-connect multiple parties in an interactive environment exhibiting virtual picture books in accordance with the present invention.

FIG. 6 is a layout of browser manipulated by one embodiment of the present invention to inter-connect multiple parties in an interactive environment exhibiting virtual picture books in accordance with the present invention.

FIG. 6 illustrates one embodiment of a browser configuration 600 containing illustrative titles of digital picture books 112 hypothetically available to a users from the pool of digital picture books 204. In this embodiment, the digital picture books 112a-c are shown with reading statistics saved in memory, along with the dates said digital picture books 112a-c were originally published, the publisher 202 who originally published, and the cost of viewing the digital picture book 112 in a reading session with other users.

The configuration 600 also includes an account balance 614 a parent 104 has in their account with the central managing forum 102, as well as virtual buttons 606, 608, and 610 activating other browser configurations, modules and functions of the present invention.

Figure 7:
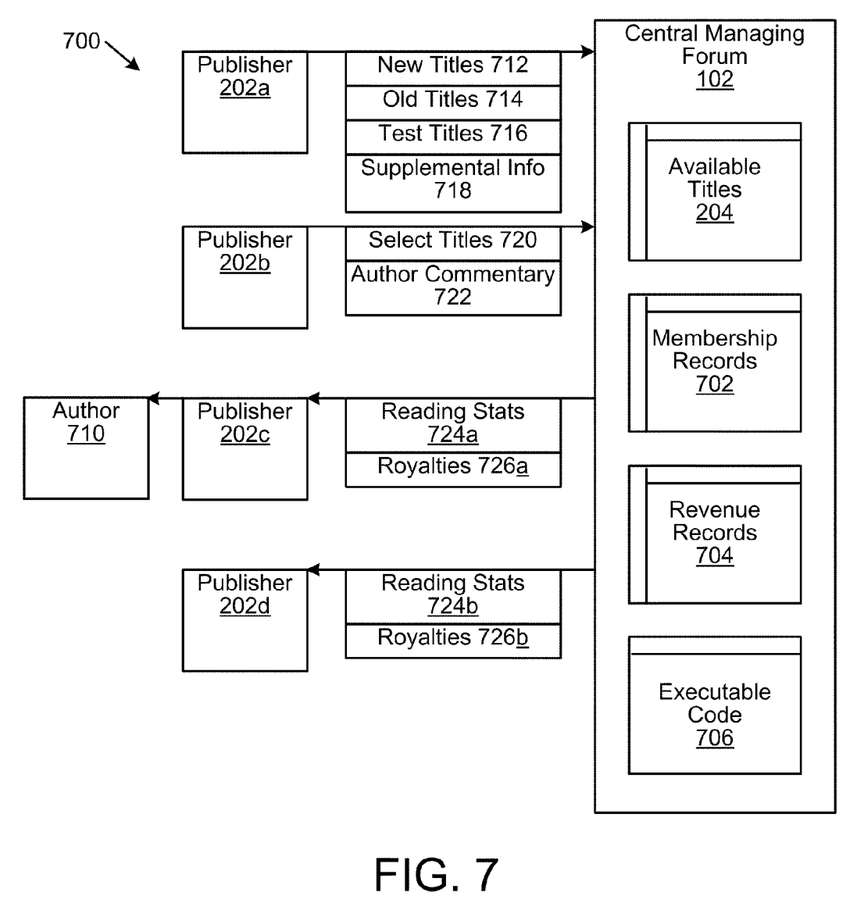
FIG. 7 is an entity-relationship diagram illustrating data flow between interconnected data entities in communication with a system that inter-connects multiple parties in an interactive environment exhibiting virtual picture books in accordance with the present invention.

FIG. 7 is an entity-relationship diagram illustrating data flow between interconnected data entities in communication with a system 700 in accordance with the present invention. The system 700 comprises a central managing forum 102, publishers 202a-d, available titles 204, membership records 702, revenue records 704, executable code 706, an author 710, new titles 712, old titles 714, test titles 716, supplemental information 718, select titles 720, author commentary 722, reading stats 724a-b, and royalties 726a-b.

The membership records 702 comprise identifying information associated with individuals who have registered with the central managing forum 102. The membership records 702 may comprise the name and contact information of any person, company or organization that registers with the central managing forum 102.

The revenue records 704 are stored in memory 404 and comprise computer readable records of expenditures, income, account balances and the like for each user of the system 700. Revenue records 704, in the preferred embodiment, are stored in a computer readable database.

The executable code 706 comprises the source code executable to perform operations for displaying digitized graphic media to multiple interconnected parties in the system 700 and computer program products of the present invention.

In some embodiments of the present invention, a publisher 202a uploads a variety of digital picture books 112 to the central managing forum 102 in batches. One batch may comprise new titles 712, or new digital picture books 712. One batch may comprise old titles 714, and another batch may comprise test titles 716.

Test titles 716 may be a batch of digital picture books 112 that the publisher 202a has not yet printed and made available to consumers in hard-copy. The publishers 202a may be making the test titles 716 exclusively available to the system 700 for the purpose of testing market reaction to the titles and/or the commercial prospects of the test titles 716. The system 700 may track reading statistics 724 which it shares with the publisher 202a in response to receiving the test titles 716. In the shown embodiment, reading statistics 724a-b are shared with publishers 202c-d, who have previously updated digital picture books 112 to system 700.

Author commentary 722 and supplemental information 718 may be uploaded to the central managing forum 102 in the same manner that batches 712, 714, 716 are uploaded.

The supplemental information 718 comprises supplemental information which a publisher wishes to send the central managing forum 102. In some embodiments of the present invention, the supplemental information 718 comprises coupon codes generated by a publisher 202, or given to the publisher 202 by the central managing forum 102, which, when entered by a user during registration, enable only a portion of the pool of available titles 204. In so doing, users provided with coupon codes by a publisher 202 may be limited to access through the central managing forum 102 only to digital picture books 112 published by the publisher 202. In still further embodiments, users provided with coupon codes by a publisher 202 may have access to all available titles in the pool of available titles 204, but have a virtual bookshelf prepopulated exclusively with digital picture books 112 published by the publisher 202.

Royalties 726a-b may also be returned to publishers 202 from the system 700. The Royalties 726 may comprise PayPal payments, money wires, eChecks, credits, vouchers or the like, and may be remitted electronically to one or more publishers through other third-party banks and management systems or organizations.

Ultimately, the author 710 may receive reading statistics 724a from a publisher 202c.

The functions of the systems shown in the present invention correspond generally to other systems, methods, apparatii and computer program products outlined in the present invention, and further illustrates the availability of different allocations of functionality amongst modules that implement an embodiment of the invention. To the extent that hardware, software, and firmware implementations are deemed partially or fully interchangeable at the time in question (now or hereafter) by one of skill in the art, they may be utilized in embodying the invention even though the specific implementation examples discussed here are different.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory computer program product comprising a computer readable medium having computer usable program code executable to perform operations for displaying digitized graphic media to multiple interconnected parties, the operations of the computer program product comprising:
   incorporating identifying personal information of one or more users into a database under the exclusive control of a central managing forum, wherein said identifying personal information is voluntarily provided by the one or more users to the central managing forum via a computer network for a purpose of creating exclusive user accounts;
   storing reading preferences of the one or more users in the database;
   prompting a user to create a reading session;
   prompting the user to choose a digitized picture book from a pool of digitized picture books stored in a computer readable medium;
   prompting via a computer network one or more users to join the reading session who have been selected by the user creating the session;
   interconnecting one more users prompted to join the reading session with the user creating the reading session, such that each of the users in the reading session are in video, audio and autographic contact with each of the other users in the reading session;
   simultaneously displaying the digitized picture book to each of the one or more users in the reading session;
   prompting the one or more users in the reading session to interactively navigate the digitized picture book; and
   tallying the number of times the digitized picture book is displayed in reading sessions created by users.

2. The computer program product of claim 1, further comprising offering the functional ability to create a membership network accessible only to users who have opted in to the membership network and been approved by one or more network administrators.

3. The computer program product of claim 1, wherein the central managing forum stores and displays a plurality of icons hyperlinked to digitized picture books preselected by a user to appear in a virtual bookshelf, wherein the virtual bookshelf is designed to visually resemble an actual bookshelf and exclusively accessible to a single user and the central managing forum.

4. The computer program product of claim 3, wherein a user preselecting one or more digitized picture books to appear in the virtual bookshelf is a user other than the user with primary access to the virtual bookshelf.

5. The computer program product of claim 3, wherein the central managing forum analyzes similarities and differences between the digitized picture books appearing in a plurality of virtual bookshelves and makes recommendations that one or more users add specific digitized picture books to one or more virtual bookshelves which specific digitized picture books are identified from the analysis of similarities and differences.

6. The computer program product of claim 2 or claim 3, wherein a first user makes a recommendation that one or more second users add a specific digitized picture book to a virtual bookshelf.

7. The computer program product of claim 3, further comprising previewing a digitized picture book to a user in a pop-up window on a computer display.

8. The computer program product of claim 1, further comprising displaying statistics representative of a plurality of users' reading habits to a user.

9. The computer program product of claim 1, wherein the pool of digitized picture books is updated by a plurality of third-parties in logical connection with the central managing forum, wherein the central managing forum awaits the active update of the pool of digitized picture books by the third-parties.

10. The computer program product of claim 1, wherein the simultaneously displayed digitized picture book is overlaid with virtual buttons activated by the interconnected users to navigate pages of the displayed digitized picture book.

11. The computer program product of claim 1, wherein pictures in the simultaneously displayed digitized picture book are automatically altered by the central managing forum to create the perception of animation using one effect from the group consisting of: a zooming effect, a fading out effect, a morphing to another image effect, a spiraling effect, an exploding effect, and a perception of a page being turned.

12. The computer program product of claim 1, further comprising inviting a plurality of users to join a reading session created by an author who has written the digitized picture.

13. A system to display digitized graphic media to multiple interconnected parties, the system comprising:
   a processor;
   a data storage means for storing data;
   a central managing forum to store, transfer and deliver data over an Internet to a plurality of users, the central managing forum comprising:
      an incorporation module configured to incorporate identifying personal information of one or more users into a database under the exclusive control of a central managing forum, wherein said identifying personal information is voluntarily provided by the one or more users to the central managing forum via a computer network for a purpose of creating exclusive user accounts;
      a storage module configured to store reading preferences of the one or more users in the database;
      a first prompter module configured to prompt a user to create a reading session;
      a second prompter module configured to prompt the user to choose a digitized picture book from a pool of digitized picture books stored in a computer readable medium;
      a third prompter module configured to prompt via a computer network one or more users to join the reading session who have been selected by the user creating the session;
      an interconnection module configured to interconnect one more users prompted to join the reading session with the user creating the reading session, such that each of the users in the reading session are in video, audio and autographic contact with each of the other users in the reading session;
      a display module configured to simultaneously display the digitized picture book to each of the one or more users in the reading session;
      a fourth prompter module configured to prompt the one or more users in the reading session to interactively navigate the digitized picture book; and
      a tally module configured to tally the number of times the digitized picture book is displayed in reading sessions created by users.

14. The system of claim 13, further comprising a friend module configured to offer the functional ability to create a membership network accessible only to users who have opted in to the membership network and been approved by one or more network administrators.

15. The system of claim 14, wherein the central managing forum is configured to store and displays a plurality of icons hyperlinked to digitized picture books preselected by a user to appear in a virtual bookshelf, wherein the virtual bookshelf is designed to visually resemble an actual bookshelf and primarily accessible to a single user and the central managing forum.

16. The system of claim 14, wherein the user preselecting one or more digitized picture books to appear in the virtual bookshelf is a user other than the user with primary access to the virtual bookshelf.

17. The system of claim 14, wherein the central managing forum analyzes similarities and differences between the digitized picture books appearing in a plurality of virtual bookshelves and makes recommendations that one or more users add specific digitized picture books to one or more virtual bookshelves which specific digitized picture books are identified from the analysis of similarities and differences.

18. The system of claim 14, wherein a plurality of virtual bookshelves are primarily associated with, and accessible to, a single user, wherein said bookshelves are prepopulated by the central managing forum with a plurality of books from a genre selected from the following group: seasonal books, newly released books, books targeting readers of certain age, books authored by a pre-identified party, books published by a pre-identified publisher, and popular books.

19. The system or claim 14, wherein a first user makes a recommendation that one or more secondary users add a specific digitized picture book to a virtual bookshelf.

20. The system of claim 14, further comprising a previewing module configured to preview a digitized picture book to a user in a pop-up window on a computer display.

21. The system of claim 13, wherein the pool of digitized picture books is updated by a plurality of third-parties in logical connection with the central managing forum, wherein the central managing forum awaits the active update of the pool of digitized picture books by the third-parties.

22. The system of claim 13, further comprising a provider module configured to provide a first user of the one or more users to the reading session the option of confidentially browsing a bookshelf exclusively associated with the first user, and choosing a second digitized picture book from the pool of digitized picture books for use in the reading session.

23. The system of claim 13, wherein the one or more users to the reading session can choose to be simultaneously connected to a plurality of reading sessions.

* * * * *